US008781982B1

(12) United States Patent
Das et al.

(10) Patent No.: US 8,781,982 B1
(45) Date of Patent: Jul. 15, 2014

(54) SYSTEM AND METHOD FOR ESTIMATING REMAINING USEFUL LIFE

(75) Inventors: Sreerupa Das, Oviedo, FL (US);
Gregory A. Harrison, Oviedo, FL (US);
Richard Hall, Orlando, FL (US);
Michael A. Bodkin, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 324 days.

(21) Appl. No.: 13/241,674

(22) Filed: Sep. 23, 2011

(51) Int. Cl.
*G06E 1/00* (2006.01)
*G06E 3/00* (2006.01)
*G06F 15/18* (2006.01)
*G06G 7/00* (2006.01)
*G06N 3/04* (2006.01)
*G06N 3/08* (2006.01)

(52) U.S. Cl.
CPC *G06E 1/00* (2013.01); *G06F 15/18* (2013.01); *G06E 3/00* (2013.01); *G06G 7/00* (2013.01); *G06N 3/049* (2013.01); *G06N 3/08* (2013.01)
USPC .......................................................... 706/21

(58) Field of Classification Search
CPC ............. G06E 1/00; G06E 3/00; G06F 15/18; G06G 7/00; G06N 3/049; G06N 3/08
USPC ......................................... 706/21, 16, 15, 62
See application file for complete search history.

(56) References Cited

U.S. PATENT DOCUMENTS

| | | | |
|---|---|---|---|
| 5,968,371 A * | 10/1999 | Verdegan et al. | 210/739 |
| 6,351,713 B1 * | 2/2002 | Board et al. | 702/42 |
| 6,438,445 B1 | 8/2002 | Yoshida et al. | |
| 6,847,854 B2 | 1/2005 | Discenzo | |
| 7,581,434 B1 * | 9/2009 | Discenzo et al. | 73/53.01 |
| 7,725,293 B2 | 5/2010 | Bonissone et al. | |
| 7,933,754 B2 | 4/2011 | Goebel et al. | |
| 2004/0101023 A1 * | 5/2004 | Choi | 374/141 |
| 2004/0179915 A1 | 9/2004 | Hill et al. | |
| 2004/0249779 A1 * | 12/2004 | Nauck et al. | 706/47 |
| 2006/0212209 A1 * | 9/2006 | Cesario et al. | 701/106 |
| 2006/0247798 A1 | 11/2006 | Subbu et al. | |
| 2007/0088550 A1 | 4/2007 | Filev et al. | |

(Continued)

OTHER PUBLICATIONS

Angus, "Criteria for Choosing the Best Neural Network: Part I", Department of Mathematics The Claremont Graduate School and Medical Information Systems and Operations Research Department Naval Health Research Center, Sep. 1991.*

(Continued)

*Primary Examiner* — Jeffrey A Gaffin
*Assistant Examiner* — Ilya Traktovenko
(74) *Attorney, Agent, or Firm* — Withrow & Terranova, PLLC

(57) ABSTRACT

Mechanisms for predicting a remaining useful life of a cutter head of a milling machine that includes a plurality of flutes are disclosed. Features are extracted from reference data associated with a plurality of reference cutter heads. The reference data includes reference vibration data and reference wear data. At least two Neural Network predictive models are trained in parallel for predicting the remaining life of a new cutter head based upon the extracted features. Operational data associated with the new cutter head is obtained. The operational data includes operational vibration data and operational wear data. Features extracted from the operational data are input into an optimal predictive model of the at least two Neural Network predictive models. A remaining useful life of the new cutter head is estimated by the optimal predictive model.

20 Claims, 9 Drawing Sheets

(56) References Cited

U.S. PATENT DOCUMENTS

| | | | |
|---|---|---|---|
| 2007/0122347 A1* | 5/2007 | Statnikov et al. | 424/9.341 |
| 2008/0208487 A1* | 8/2008 | Goebel et al. | 702/34 |
| 2008/0224838 A1* | 9/2008 | Rains et al. | 340/438 |
| 2010/0106458 A1* | 4/2010 | Leu et al. | 702/181 |
| 2010/0114806 A1* | 5/2010 | Harrison et al. | 706/14 |

OTHER PUBLICATIONS

Fogel, "An Information Criterion for Optimal Neural Network Selection", IEEE Transactions on Neural Networks, vol. 2. No. 5. Sep. 1991.*

Tian, "An artificial neural network method for remaining useful life prediction of equipment subject to condition monitoring", Published online, Nov. 4, 2009.*

Tian et al, "A neural network approach for remaining useful life prediction utilizing both failure and suspension histories", Available online Nov. 27, 2009.*

Riedmiller, Martin et al., A Direct Adaptive Method for Faster Backpropagation Learning: The RPROP Algorithm, 1993, pp. 586-591.

Scanlon, Patricia, et al., Acoustic Signal Processing for Degradation Analysis of Rotating Machinery to Determine the Remaining Useful Life, 2007 IEEE Workshop on Applications of Signal Processing to Audio and Acoustics, Oct. 21-24, 2007, New Paltz, NY, pp. 90-93.

Xiang, Li et al., An Intelligent Predictive Engine for Milling Machine Prognostic Monitoring, 2006 IEEE International Conference on Industrial Informatics, pp. 1075-1080.

X. Li, et al., Fuzzy Neural Network Modelling for Tool Wear Estimation in Dry Milling Operation, Annual Conference of the Prognostics and Health Management Society, 2009, pp. 1-11.

Rumelhart, David E. et al., Learning representations by back-propagating errors, Nature vol. 323 Oct. 9, 1986, pp. 533-536.

X. Li et al., Multi-modal sensing and correlation modelling for condition-based monitoring in milling machine, SIMTech technical reports, vol. 8, No. 1, Jan.-Mar. 2007, pp. 50-56.

Zeng, Hao et al., Multi-modal Sensing for Machine Health Monitoring in High Speed Machining, 2006 IEEE International Conference on Industrial Informatics, pp. 1217-1222.

Kandilli, Ismet et al., Online Monitoring of Tool Wear in Drilling and Milling by Multi-Sensor Neural Network Fusion, Proceedings of the 2007 IEEE International Conference on Mechatronics and Automation, Aug. 5-8, 2007, Harbin, China, pp. 1388-1394.

Patnaik, L.M. et al.Target detection through image processing and resilient propagation algorithms, Neurocomputing 35 (2000), pp. 123-135.

Astakhov, Viktor et al., The assessment of plastic deformation in metal cutting, Journal of Materials Processing Technology 146 (2004), pp. 193-202.

\* cited by examiner

SYSTEM AND METHOD FOR ESTIMATING REMAINING USEFUL LIFE

FIELD OF DISCLOSURE

The present disclosure generally relates to the field of prognosis and predictive maintenance, and in particular, to systems and methods for estimating the remaining useful life of equipment or machines using a neural network model containing extracted features from conditioned data.

BACKGROUND

Remaining useful life (RUL) of running machines, machine components and equipment and the like is important information to system planning and operation. Known RUL in system planning can lead to more efficient use of the machine, less down time, and less faults. This, in turn, can lead to cost savings, avoidance of sudden breakdowns while in operation, and appropriate selection of installation or maintenance time. Thus, industries have long sought a method of predicting or estimating the RUL of various types of machines.

Estimating the RUL of a machine, machine component, system of a machine or other equipment is known in the art as prognostics. Predicting remaining life is not straightforward because, ordinarily, remaining life is conditional upon a variety of factors including future usage conditions. Examples of equipment that may benefit from the use of remaining life estimates are military and commercial fielded vehicles including automobiles, tanks, helicopters and other aircraft (both military and commercial), medical equipment, industrial or agricultural equipment, and power plants.

A common approach to prognostics is to employ a data-driven approach to take advantage of time series data where equipment behavior has been tracked via sensor outputs during normal operation up until an end of equipment useful life. The end of equipment useful life may represent a totally non-functioning state of the equipment, for example, equipment failure. The end of equipment useful life can also represent a state of the equipment wherein the equipment no longer provides expected results. Alternatively, the end of useful life may be defined as when the equipment reaches a condition of imminent failure. When a reasonably-sized set of these observations exists, pattern recognition algorithms can be employed to recognize these trends and predict remaining life. These predictions are often made under the assumption of near-constant future conditions. However, such run-to-end-of-equipment-useful-life data are often not available because, when the observed system is complex, expensive, and, safety is important, faults will be repaired before they lead to the end of equipment useful life. This deprives the data driven approach from information necessary for its proper application.

SUMMARY OF THE DISCLOSURE

The present disclosure is designed to provide predictive estimates of RUL for machines, machine components, equipment and the like using conditioned data obtained from peer systems. In one example embodiment, the present disclosure relates to systems and methods for estimating the RUL of a machine component in a new or unseen environment based upon limited, observable, data. In one example embodiment, the systems and methods of the disclosure herein are useful in the diagnosis and prognosis of faults in machinery, machine components, industrial and agricultural equipment, fielded vehicles (tanks, helicopters, and the like), aircraft engines (both military and commercial), medical equipment, and power plants in real time to prevent impending failure.

An example embodiment of the disclosure includes a method to estimate the RUL of a specific machine component, e.g., a CNC milling machine cutter via a predictive model. The method generally includes making available a set of historical peer equipment data (peer data) having a relationship to the behavior of the machine component from a database of raw data. In an example embodiment, the data is based upon wear. The peer data is conditioned, or de-noised, by having outliers removed from the peer data set, performing a wavelet analysis, or applying smoothing algorithms. Thereafter, certain features are extracted from the peer data, including but not limited to, force, acoustic emission and vibration data. The extracted features are used to build a Neural Network (NN) predictive model. Thereafter, the NN model is trained to select the best predictive model for the RUL estimation. In an example embodiment, a resilient back propagation learning algorithm having at least one weighting function is applied such that the best NN model is selected. Once the NN Model is selected raw operational data relating the machine component is obtained from either sensors in signal communication with the component or a database. The raw operational data is conditioned and features are extracted in a similar manner to the peer data. The conditioned operational data is then fed into the NN model and an output RUL for the component is generated. In example embodiments, if the RUL output is within a defined range a signal notice is generated.

Another example embodiment of the disclosure includes a system for estimating the RUL of a machine component. The system includes a database comprising a set of peer data having a relationship to the behavior of the machine component; a processor in signal communication with the database; and at least one computational model application for executing on the processor, the at least one computational model application performing a method. The method generally includes making available a set of historical peer equipment data (peer data) having a relationship to the behavior of the machine component from a database of raw data. In an example embodiment, the data is based upon wear. The peer data is conditioned, or de-noised, by having outliers removed from the peer data set, performing a wavelet analysis, or applying smoothing algorithms. Thereafter, certain features are extracted from the peer data, including but not limited to, force, acoustic emission and vibration data. The extracted features are used to build a Neural Network (NN) predictive model. Thereafter, the NN model is trained to select the best predictive model for the RUL estimation. In an example embodiment, a resilient back propagation learning algorithm having at least one weighting function is applied such that the best NN model is selected. Once the NN Model is selected raw operational data relating the machine component is obtained from either sensors in signal communication with the component or a database. The raw operational data is conditioned and features are extracted in a similar manner to the peer data. The conditioned operational data is then fed into the NN model and an output RUL for the component is generated. In example embodiments, if the RUL output is within a defined range a signal notice is generated.

Another example embodiment includes program storage device readable by a computer, the device embodying a program or instructions executable by the computer to perform the above described method.

Additional features and advantages of the disclosure will be set forth in the detailed description which follows, and in part will be readily apparent to those skilled in the art from that description or recognized by practicing the disclosure as described herein, including the detailed description which follows, the claims, as well as the appended drawings.

It is to be understood that both the foregoing general description and the following detailed description present example embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure, and together with the detailed description, serve to explain the principles and operations thereof.

BRIEF DESCRIPTION OF THE DRAWINGS

The present subject matter may take form in various components and arrangements of components, and in various steps and arrangements of steps. The appended drawings are only for purposes of illustrating example embodiments and are not to be construed as limiting the subject matter.

DETAILED DESCRIPTION

Figure 1A:
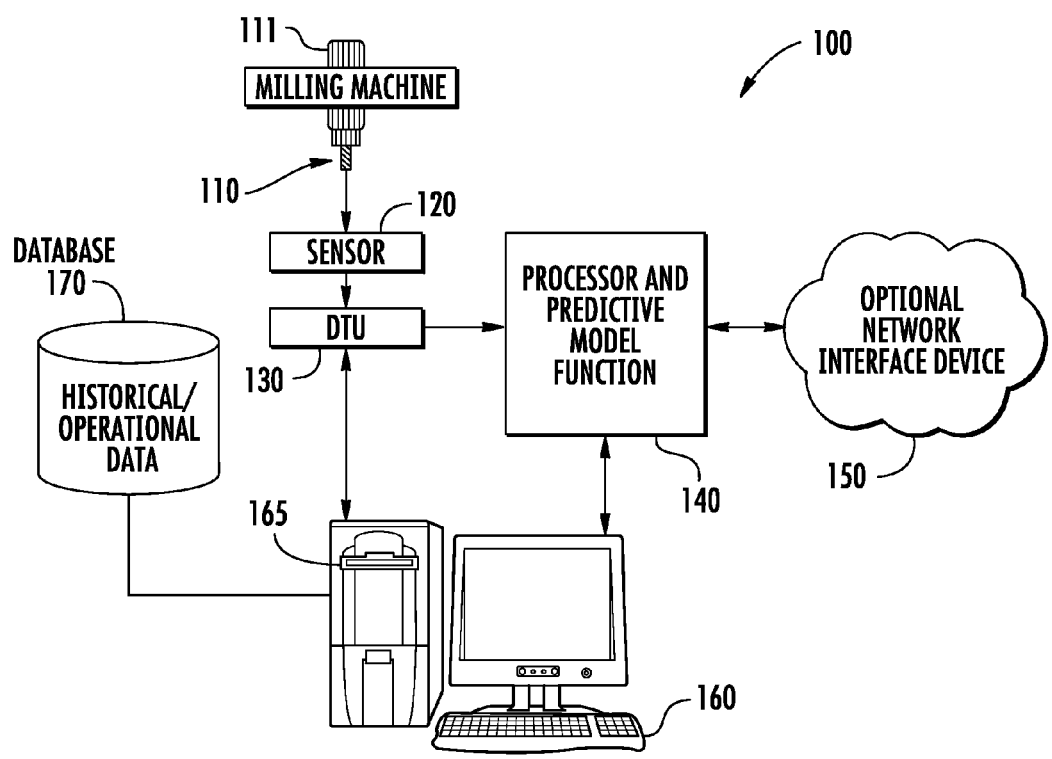
FIG. 1A is a schematic diagram of a RUL estimation system according to one example embodiment of the present disclosure.

The present disclosure will now be described more fully hereinafter with reference to the accompanying drawings in which example embodiments of the disclosure are shown. However, this disclosure may be embodied in many different forms and should not be construed as limited to the embodiments set forth herein. These example embodiments are provided so that this disclosure will be both thorough and complete, and will fully convey the scope of the disclosure to those skilled in the art. Like reference numbers refer to like elements throughout the various drawings. Further, as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

In one example embodiment, the present disclosure relates to systems and methods for estimating the RUL of a machine component. The RUL may be estimated in a new or unseen environment based upon limited, observable data. In one example embodiment, the systems and methods of the disclosure herein are useful in the diagnosis and prognosis of faults in machinery, machine components, industrial and agricultural equipment, fielded vehicles (tanks, helicopters, and the like), aircraft engines (both military and commercial), medical equipment, and power plants in real time to prevent impending failure. In one example embodiment, the systems and methods of the disclosure are useful in estimating the RUL of a machine component based upon the wear of the machine component which is in with another surface, where the "wear" or wear pattern can affect the performance of the machinery. An embodiment of the disclosure will provide a peer-based, data-driven approach that relies upon operational data gathered from other, similar (peer) components or equipment as well as operational data gathered from a target machine component to provide a RUL forecast for the target machine component. In one example embodiment, the approach will operate in the absence of run-to-end-of-equipment-useful-life-data. In one example embodiment, operational peer or reference data from a plurality of related equipment are collected and stored in a database in signal communication with a processor for monitoring and analysis. This stored peer or reference data will be used in the building and training of a Neural Network (NN) predictive model such that an optimal predictive model is selected. The operational peer or reference data are conditioned and serve as a starting point in the RUL estimate. Once an optimal NN Predictive model is selected, operational data from a target component is collected and fed into the NN predictive model for estimating the target component's RUL. This disclosure also takes into consideration that the benefits of machinery monitoring and condition-based maintenance may be significantly enhanced by integrating real-time diagnostics and prognosis techniques within the framework described herein.

In one example embodiment, various high level data analysis, modeling and utilization schemes in connection with providing some advantages associated with the disclosure are employed. For example, Neural Network models can be employed in connection with the subject disclosure. In one example embodiment, at least one NN predictive model having at least one weighting function is built and trained to estimate the RUL of a target machine component. In another example embodiment, at least two NN predictive models are built and trained to estimate the RUL of a target machine component. In still another example embodiment, at least two NN predictive models are built in parallel and trained to estimate the RUL of a target machine component. The at least one weighting function is adjusted during the training of the NN predictive model such that an optimal model is selected for the estimation of the RUL of the target component. Once an optimal NN predictive model is selected real time operational data from the target component is used to predict the RUL. The Neural Network modeling functions described herein are peer or reference based, data-driven predictive modeling functions. Such models are trainable using mathematically well-defined algorithms (e.g., learning algorithms). That is, such models may be developed by training them to accurately map process inputs onto process outputs based upon measured or existing process data. This training requires the presentation of a diverse set of several input-output data vector tuples, to the training algorithm. The trained models may then accurately represent the input-output behavior of the underlying processes. In one example embodiment, the input data may be based upon the wear of a machine component that has contact with another surface, where the "wear" or wear pattern can affect the performance of the machinery.

Referring now to FIGS. 1A, 1B, 2A and 2B, a system and method for estimating the RUL of a machine component is illustrated. As illustrated in FIG. 1A and in one example embodiment, a schematic diagram of an embodiment of a peer or reference based, data-driven prediction system 100 is depicted. In an embodiment, the prediction system 100 includes a target machine component 110, at least one sensor 120, a data transfer unit (DTU) 130, a processor 140, an optional network interface device 150, a computer 160, and a database 170. The computer 160 further includes a program storage device 165. In one experimental example embodiment (described in more detail below), the target component 110 is a CNC cutter of a CNC milling machine 111. However, it will be understood by those skilled in the art that the experimental example described herein is not limiting as the target component 110 may be any machine component subject to fault or maintenance.

In an embodiment, the at least one sensor 120 is disposed and configured to be responsive to an operating condition of the target component 110 and to generate a signal representative of the operating condition of the target component 110. In one embodiment, the at least one sensor 120 is operable for detecting and reporting defined parameters of the target component 110 in multiple dimensions, such as X, Y, Z dimensions. In an embodiment, the at least one sensor 120 may be in signal communication with the data transfer unit 130, which makes available to the processor 140 the signal representative of the operating condition of the target component 110. In an example embodiment, the at least one sensor 120 may include multiple sensors for gathering data such as vibration, acceleration, and acoustic emissions from the target component 110.

In an embodiment, the processor 140 is optionally in signal communication with a network interface device 150, such as to allow for an on-line monitoring process. The processor 140 is also in signal communication with the computer 160. In an embodiment, the computer 160 is in signal communication with the database 170. In an embodiment, the computer 160 is configured to make available to the database 170, via the processor 140, the data relating to the operating conditions of the target component. In an embodiment, the database 170 is further configured to store and make available to the computer 160 the data relating to the operating conditions of the target component, including the signals generated by the at least one sensor 120. The database 170 may also be configured to store raw operational data from peer equipment, the peer equipment having similarities to observed operational behavior of the target component (peer data) and make such peer data available to the processor 140 via the computer. 160. The computer 160 also includes the program storage device 165 configured to store, and make available to the computer 160 for execution, a computational model for estimating the RUL of the target component. The computer 160 may be a personal computer (e.g., a laptop, a desk top, or the like) or a host attached to a terminal within a network. The processor 140 is responsive to the computational model application to generate a signal corresponding to the predicted remaining target component life. It will be appreciated that the above is for illustration purposes only, and not for limitation of an embodiment of the invention.

Figure 1B:
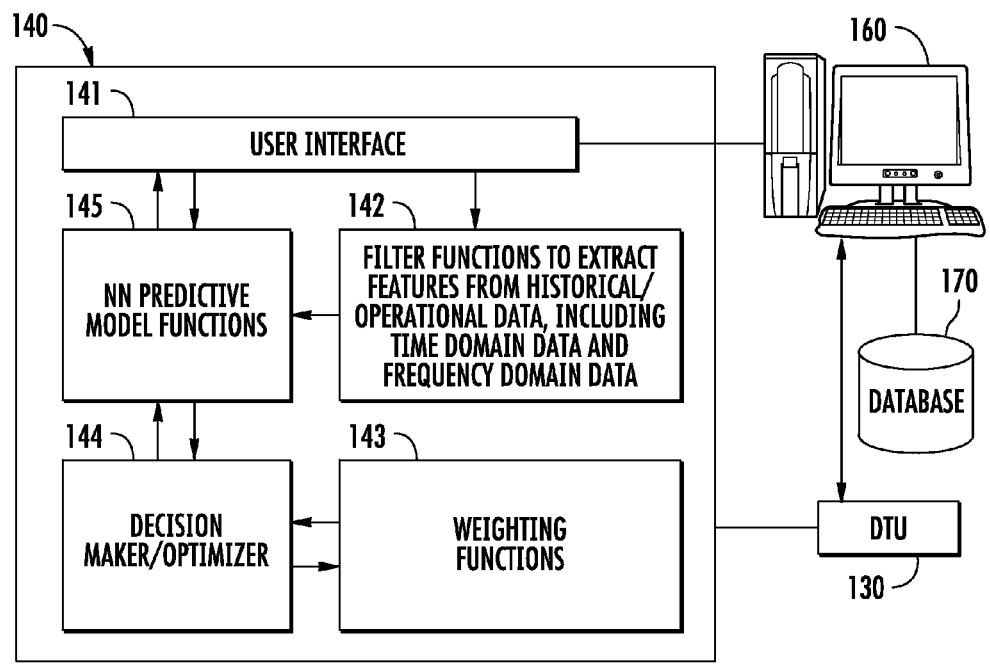
FIG. 1B is a block diagram of a model-based RUL estimation system according to one example embodiment of the present disclosure.

Referring now to FIG. 1B, a block diagram of the processor 140 is illustrated. As shown, in one example embodiment, FIG. 1B includes a processor that is in communication with the computer 160, the DTU 130 and as shown in FIG. 1A, an optional network interface device 150. The processor includes a user interface 141, NN predictive model functions 145, a decision maker/optimizer 144, weighting functions 143, and filter functions 142. The processor 140 may be implemented via computer instructions (one or more software applications) on the computer 160. Alternatively, the processor 140 may be implemented on a server or a user system (not shown). If executing on a server, a user may access the features 141, 142, 143, 144, and 145 of the processor 140 over a network via network interface device 150.

While an embodiment of the disclosure has been described having a computer 160 in signal communication with the processor 140, it will be appreciated that the scope of the disclosure is not so limited, and that the disclosure will also apply to prediction systems that have the computer 160 in direct signal communication with the data transfer unit 130. It will be further appreciated that an embodiment of the disclosure will also include the computer in signal communication via the data transfer unit 130 via a variety of communication protocols, such as cellular, wireless internet, and others, for example, to allow an connection between the computer and the data transfer unit during use of the equipment, to enable a remote, on-line estimating process.

In one example embodiment, the method disclosed first builds, trains, and selects an optimized NN predictive model for execution on the computer 160. Thereafter, the optimized NN predictive model is used to predict the remaining life of a target component 110. The method is generally based on the following steps, each of which will be described in turn, in further detail below. First, retrieval of peer or reference data from the database 170. Second, pre-processing or conditioning the peer or reference data. Third, selection and analysis of extracted features from the pre-processed or conditioned peer or reference data via noise reduction filters. Fourth, building at least one Neural Network (NN) predictive model and training the NN predictive model by using at least one adjusting or learning weighting function with the extracted features. In an alternative fourth step, at least two NN predictive models are built and trained. In still another alternative fourth step, at least two NN predictive models are built in parallel and trained. Fifth, selecting the optimal NN predictive model. Sixth, obtaining raw operational data from the target component 110. Seventh, conditioning and extracting features from the raw operational data. Eighth, feeding the extracted features into the NN predictive model such that an RUL may be determined and output. It will be understood by those skilled in the art that while the foregoing steps are set forth in numerical order, one or all of the steps may be combined such that the method is accomplished. Further, one or all of the foregoing steps may be separated into more defined steps.

Figure 2A:
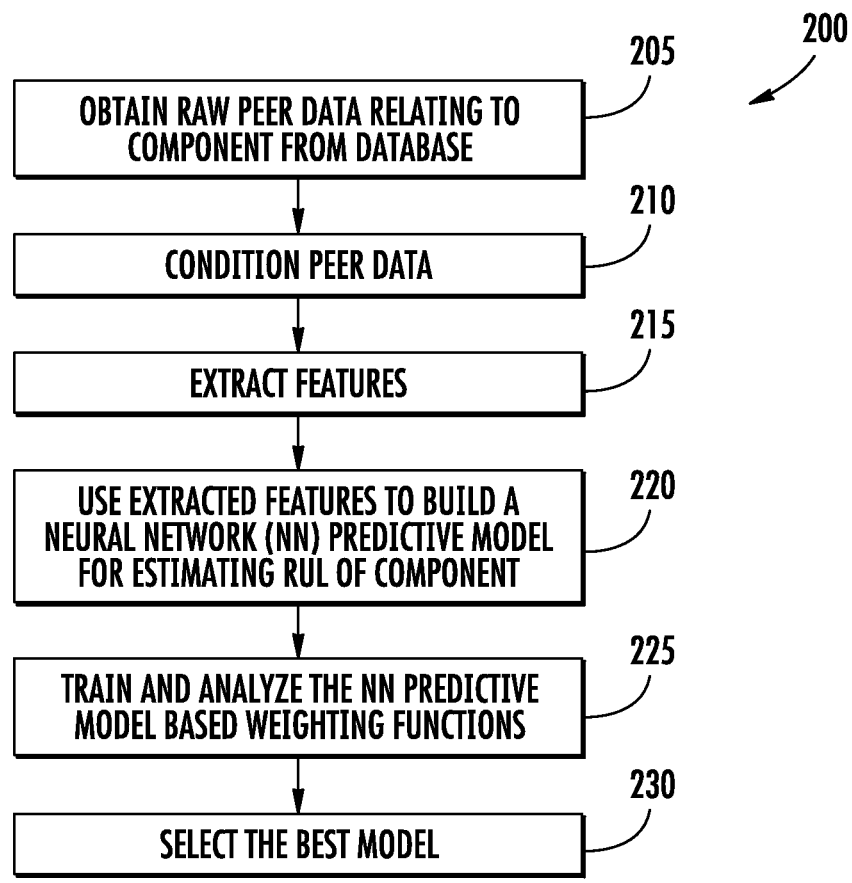
FIG. 2A is a flowchart of an example method of estimating RUL of machinery in accordance with an embodiment of the present disclosure.

Turning now to FIG. 2A, an embodiment of a generalized flowchart 200 of a portion of an example method of predicting the RUL of a target machine component is depicted. In this embodiment, the method may begin with the database 170 containing collected peer or reference data. The peer or reference data is collected in a raw form at step 205. The peer or reference data may include data from defined parameters, such as the X, Y, and Z dimensions. The peer data is then pre-processed, conditioned or de-noised at step 210 by using a set of noise reduction filters such as removing outliers of data, performing a wavelet analysis, or applying smoothing algorithms. It will be appreciated that in example embodiments the pre-processing or conditioning may include any form of processing data as known in the art, such as processing extraneous data, harmonizing data, averaging data, categorizing data, reformatting data, deleting unwanted data, or adding additional data, including the application of any reduction filters. Thereafter, features are extracted from the conditioned peer or reference data at step 215 and used to build at least one NN predictive model at step 220. The features extracted may include time domain features such as time domain data statistics and auto regressive (AR) model parameters. Time domain features can be calculated directly from raw vibration signals picked up by one or more sensors attached to the machine being monitored. Time domain data statistics include such things as root mean square (RMS), crest factor, variance, skewness, and kurtosis. Other types of features which may be extracted include frequency domain features, which may use a transform such as a Fast Fourier Transform (FFT) to transform time-based vibration signals into a frequency domain.

Once the NN predictive model is built, the NN predictive model is trained and evaluated using at least one weighting function with the extracted features at step 225. At step 230 the optimal or best NN predictive model for predicting the RUL of a target component 110 is selected. More specifically, by applying a set of optimized weights via the at least one weighting function, an optimized NN predictive model may be selected based upon the extracted features of the conditioned peer or reference data. If, during the analysis step 225, the NN predictive model is acceptable or otherwise validated, then the NN predictive model is selected at step 230. If, however, the NN predictive model is not validated, then a new NN predictive model is built using the extracted features, existing data and an adjusted at least one weighting function at step 220. Thereafter, the validation step 225 is conducted again until a satisfactory NN predictive model is found. In an example embodiment, once the at least two NN predictive models are built they are trained using at least one weighting function with the extracted features at step 225 and thereafter, the best or optimal NN predictive model is selected at step 230.

Figure 2B:
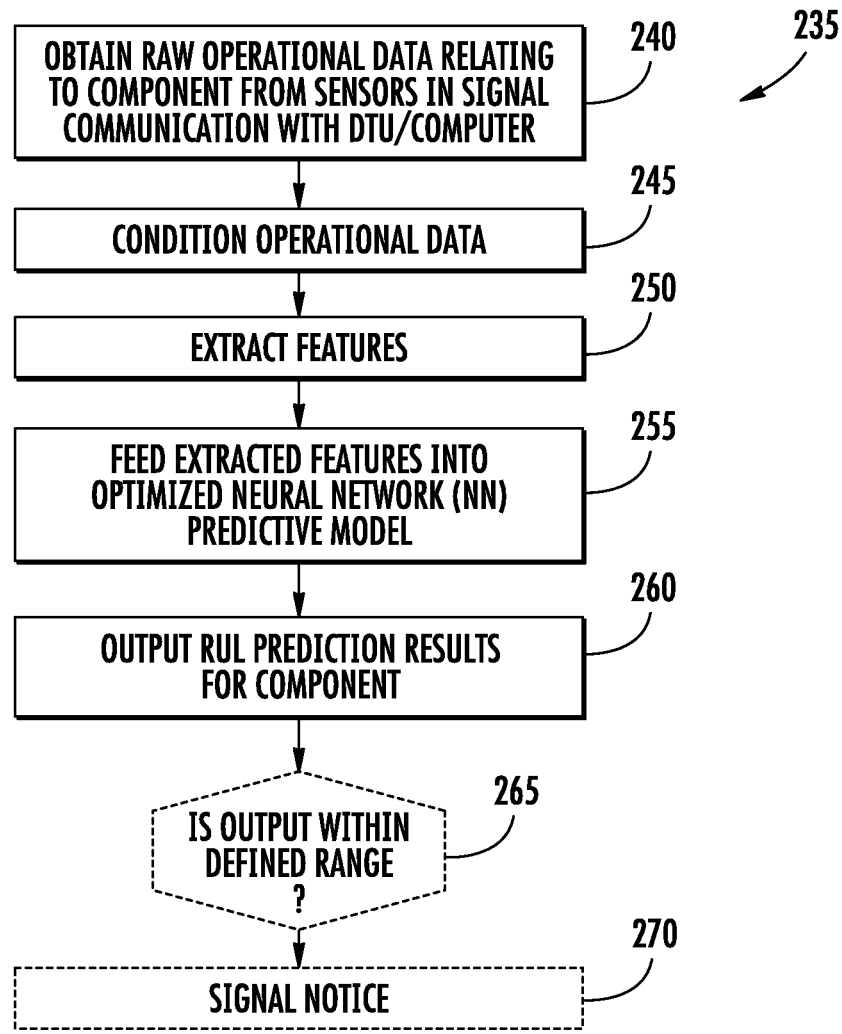
FIG. 2B is a flowchart of an example method of estimating RUL of machinery in accordance with an embodiment of the present disclosure.

Referring now to FIG. 2B, an embodiment of a generalized flowchart 235 of a portion of an example method of predicting the RUL of a machine component is depicted. In this embodiment, the method may begin with the database 170 containing operational data relating to a target component 110. Alternatively, the operational data may be obtained from at least one sensor 120 which is in signal communication with the DTU 130 and the target component 110. The operational data obtained may include real time data sensed by the at least one sensor 120. Further, the operational data may include data from defined parameters, such as X, Y, and Z dimensions. By way of example only, in one embodiment, operational vibration data may be sensed in the 3 different dimensions such as the X dimension, the Y dimension and the Z dimension. In example embodiments, where more than one sensor is employed, each sensor may obtain operational data pertaining to one or more dimensions. Thus, in an example embodiment wherein 3 sensors are employed, each sensor may obtain and report operational data of a target component pertaining to an individual dimension only. The operational data is collected in a raw form at step 240.

The operational data is then conditioned or de-noised at step 245 by using a set of noise reduction filters such as removing outliers of data, performing a wavelet analysis, or applying smoothing algorithms. Thereafter, features are extracted from the conditioned data at step 250. At step 255, the extracted features may include time domain and frequency domain data and are then fed into the optimized NN predictive model from step 230. At step 260, an RUL prediction related to the target component 110 is output. In an optional step (step 265), it is determined if the RUL output of step 260 falls within a defined range. If so, a signal notice may be sent to the computer 160 at step 270.

An experimental test was performed utilizing an example embodiment of the disclosure to estimate the RUL of three high-speed CNC milling machine cutters using dynamometer, accelerometer, and acoustic emission data and wear patterns of three similar cutters (peer data). In the experiment, six individual 3-flute cutters (C1, C2, C3, C4, C5 and C6) were provided and each cutter was used to make 315 cuts over an identical work piece for a face milling job. The spindle speed of the cutter was 10400 RPM; the feed rate was 1555 mm/min; the Y depth of cut (radial) was 0.125 mm; and the Z depth of cut (axial) was 0.2 mm. For each of the 315 cuts made by each cutter, dynamometer, accelerometer and acoustic emission data was collected and stored on a database in six sets of three hundred and fifteen data acquisition files. The peer data was collected at 50,000 Hz/channel. Each of the peer data acquisition files contained seven columns, corresponding to:

Column 1: Force (N) in X dimension
Column 2: Force (N) in Y dimension
Column 3: Force (N) in Z dimension
Column 4: Vibration (g) in X dimension
Column 5: Vibration (g) in Y dimension
Column 6: Vibration (g) in Z dimension
Column 7: AE-RMS (V)

Each peer data file contained more than 200,000 records corresponding to a time duration of more than 4 seconds required to make one cut. In addition, the wear pattern of cutters C1, C4 and C6 were collected. The wear data consisted of the wear on each of the three flutes for the three cutters after each cut (in $10^{-3}$ mm).

Figure 3:
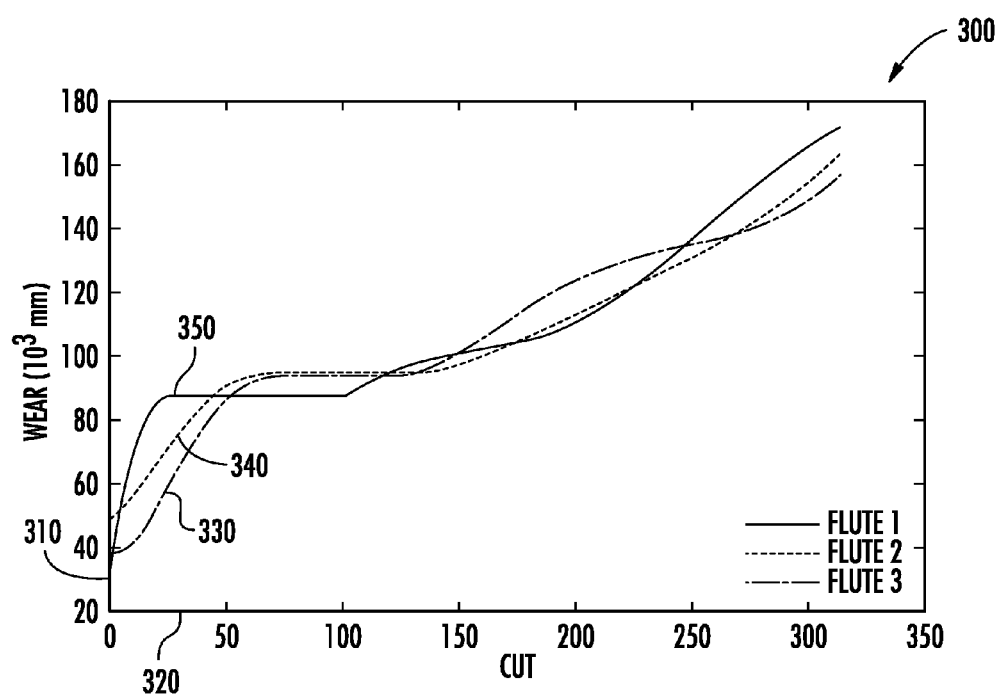
FIG. 3 is a chart including historical peer wear patterns of a milling machine cutter used with an example embodiment of the present disclosure.
Figure 4:
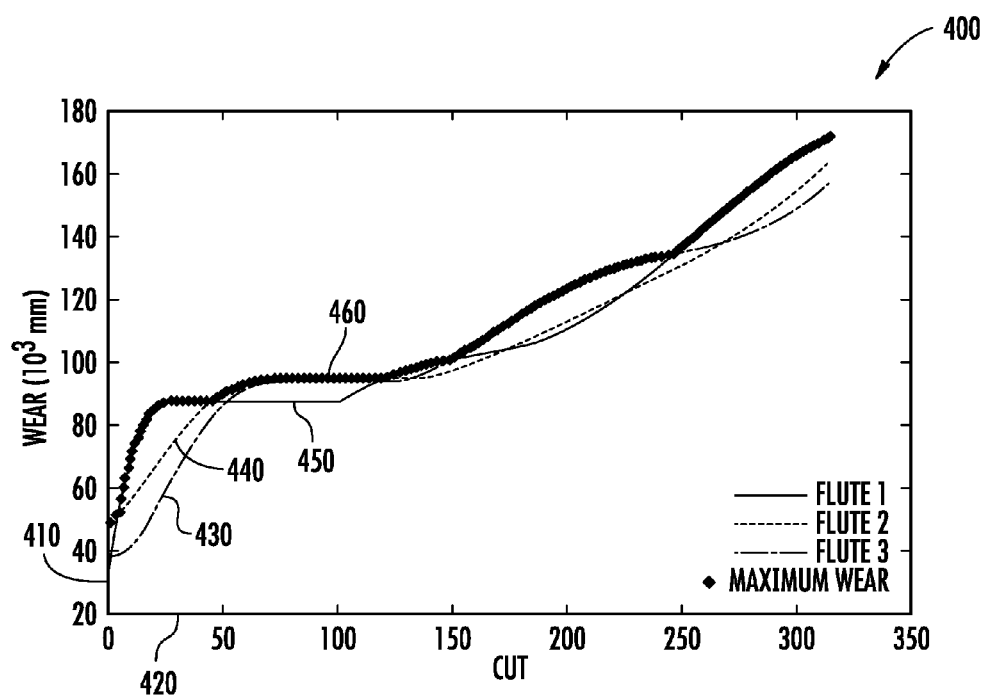
FIG. 4 is a chart including historical peer wear patterns of a milling machine cutter used with an example embodiment of the present disclosure wherein the maximum wear on the peer system components are shown.
Figure 5:
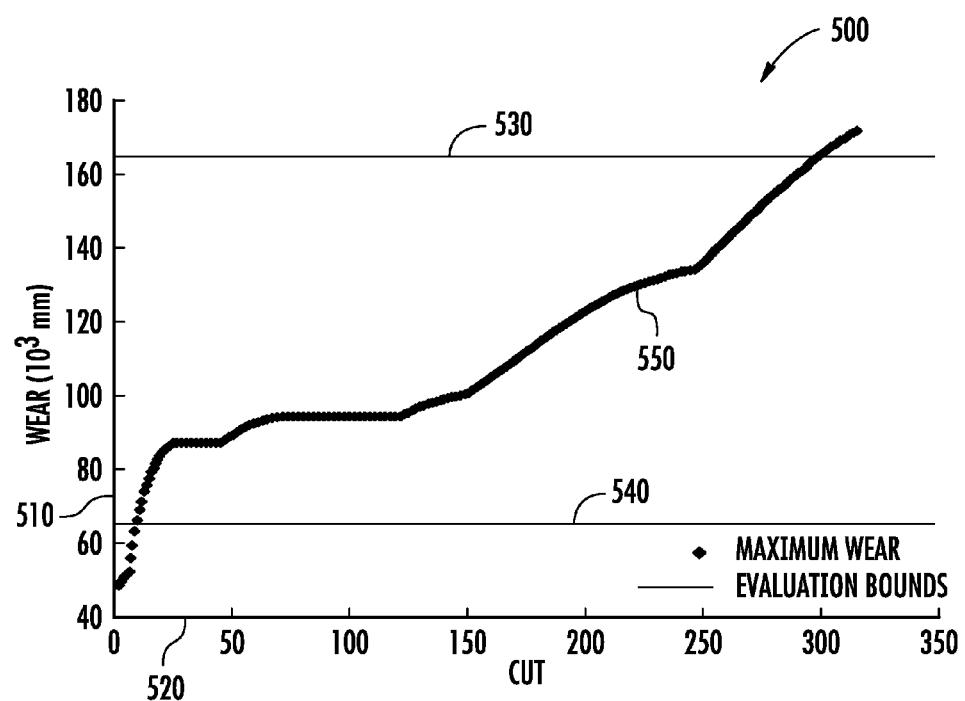
FIG. 5 is a chart including historical peer wear patterns of a milling machine cutter used with an example embodiment of the present disclosure wherein the maximum integer of safe cuts is shown.

Referring now to FIGS. 3-5, historical wear patterns of the cutter, maximum wear and maximum safe integer cuts are illustrated from the peer data collected. Referring to FIG. 3, a chart 300 illustrating the historical wear patterns of three flutes on a cutter of a milling machine is depicted. As shown, an axis 310 depicts wear and another axis 320 depicts the number of cuts performed by the peer cutters. Lines 330, 340, and 350 represent the wear of the cutters during historical operation. Referring to FIG. 4, a chart 400 illustrating the historical wear patterns of other peer data is depicted. As shown, an axis 410 depicts the wear and another axis 420 depicts the number of cuts performed by the peer cutters. Lines 430, 440, and 450 represent the wear of the cutters during historical operation and line 460 represents the maximum wear of all three flutes of the cutter. Referring now to FIG. 5, a chart 500 illustrating the maximum safe cuts for integer values of wear is depicted. As shown, an axis 510 depicts the wear and another axis 520 depicts the number of cuts performed by the peer flutes. Line 550 represents the maximum wear of all three flutes of the cutter and lines 530 and 540 represent the upper and lower bounds. As can be seen from FIG. 5, the maximum number of safe cuts needed to be predicted for the flutes of the cutter is within the range of 66-165 ($10^{-3}$ mm).

Subsequent to the peer data being collected and stored on the database 170, the peer data is was conditioned. Each peer data file contained a discrete amount of noise or disparity when compared to the rest of the data while cutting was in progress. In order to eliminate variations in end conditions, the data was de-noised via noise reduction filters. For example, the peer data in the experiment was de-noised by removing outliers. More specifically, the first few and last few records in each cut file were eliminated. Also, since this experiment and analysis was performed on face milling cutters and approximately 315 cuts were required to mill a face, to avoid disparity on the edges, the first few and the last few cut files were disregarded.

Once the peer data was conditioned, select features were extracted. Some of the features which were extracted included time domain features and frequency domain features. To provide the appropriate input for training the NN predictive model, features were extracted from the conditioned raw data on vibration, force and acoustic emission.

A wavelet analysis was also used to extract features. Using wavelet analysis, a given signal's finite energy was projected on a family of frequency bands. Information from the original signal was extracted by breaking it into a series of approximations and details distributed over different frequency bands. For a level 1 wavelet and sampling frequency of $f_s$, the decomposed frequency bandwidth of approximation and detail are defined as follows:

$$\left[0, \frac{1}{2}f_s 2^{-l}\right] \text{ and } \left[\frac{1}{2}f_s 2^{-l}, \frac{1}{2}f_s 2^{-(l-1)}\right]$$

This experiment used five levels and wavelet db3 was used in the analysis and a sampling frequency of 50 KHz, hence the wavelet transform decomposed the acquired signal into the following frequency bands:

a5: [0 Hz, 781.25 Hz]
d5: [781.25 Hz, 1562.5 Hz]
d4: [1562.5 Hz, 3125 Hz]
d3: [3125 Hz, 6250 Hz]
d2: [6250 Hz, 12500 Hz]
d1: [12500 Hz, 25000 Hz]

The foregoing results show that signals d1 through d4 were weak compared to the a5 and d5. Also, a5 demonstrates a high level of noise. Hence, d5 was used to extract the features.

After the features were extracted from the conditioned peer data, a NN predictive model was built and trained to select the best model for predicting the RUL of the cutter based upon wear. The NN predictive model was based on the peer data C1, C4 and C6 (training set) to determine the wear pattern of the cutters C2, C3 and C5 (test set). In other words, using the peer data and wear patterns of training set the wear patterns for the test set was determined. In building the NN predictive model with the extracted features, a multi-layer Neural Network model was utilized. In the experimental example embodiment described a 3 layer neural Network is employed, however, the present disclosure is not limited to 3 layers and may utilize more or less layers as needed or desired. The NN predictive was built and trained on the task of learning the wear patterns from derived features.

Figure 6:
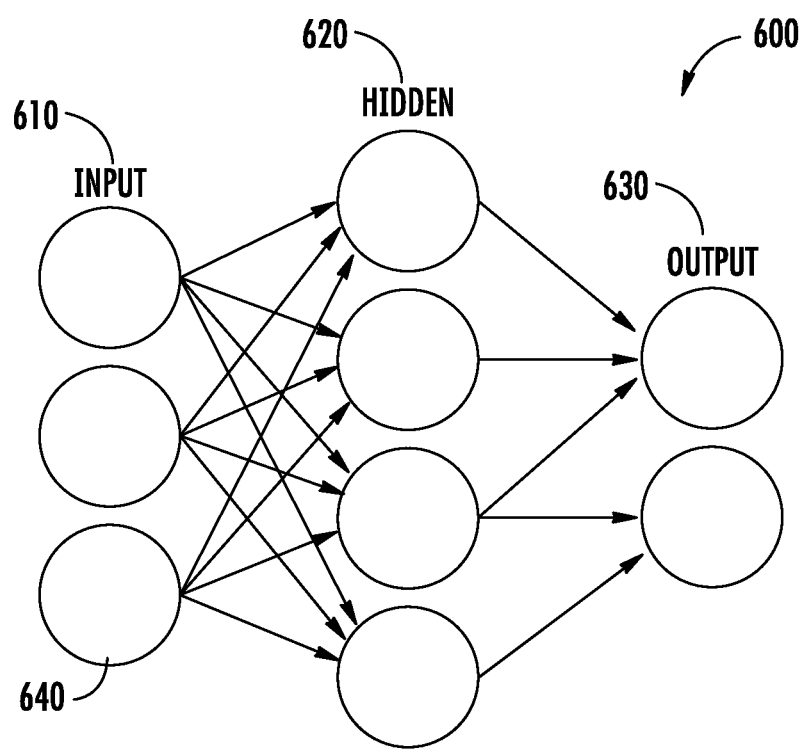
FIG. 6 illustrates an example Neural Network model in accordance with an example embodiment of the disclosure.

A representative simple Neural Network model is shown in FIG. 6. As shown, the Neural Network model 600 is organized into three layers, input 610, hidden 620 and output 630. Layers 610, 620, and 630 are made up of a number of interconnected neurons or nodes 640, each of which contains an activation function. Patterns are presented to the network via the input layer 610, which communicates to one or more hidden layers 620 where the actual processing is done via a system of weighted connections. The hidden layers 620 then link to an output layer 630 where the answer is output.

In this experiment and example embodiment, a traditional back-propagation learning algorithm was employed within the model 600. Thus, 'learning' within the model 600 was supervised through each cycle or epoch (i.e. each time the network was presented with a new input pattern) through a forward activation flow of outputs, and the backwards error propagation of weight adjustments. More simply, for the three layered Neural Network model 600 of the example embodiment, an input layer (p), a hidden layer (h) and an output layer (o) were used. An input pattern was presented to the input neurons. In the forward pass, the input layer propagated activations to the hidden layer neuron and the hidden layer activations propagated to the output layer. The activation $y_i$ of a neuron i can was computed as:

$$y_i = g\left(\sum_{j=1}^{N} w_{ij} x_j - \theta_i\right)$$

where wij was the weight of the connection from neuron i to neuron j, $x_j$ was the value of activation of neuron j and $\theta i$ was a bias for neuron i and g was a transfer function. A sigmoidal transfer function was used for hidden layer and a linear transfer function was used for the output layer.

In order to learn the input-to-output relation, the output activations produced the target pattern $t_k$ when presented as input the pattern $p_i$. For one pattern, p, it was found that the error made by the network's output layer could be computed as follows:

$$E_p = \sum_K (t_k - o_k)^2$$

In order to lower this error, the connections between the output and hidden layer were changed by the amount:

$$\partial E/(\partial w_j jk) = (_j k = (t_j k - o_j k)$$

Hence, $$\Delta \omega_{jk} = \eta \delta_k h_j$$

To modify the connections between input and hidden layer the following equation (back propagation of error) was used:

$$\Delta_j = h_j(1-h_j)\Sigma_k(\delta_k \omega_{kj})$$

$$\Delta \omega_{ij} = \eta \delta_j p_i$$

Hence,
The summation in the equation above represents the actual back-propagation of the error signal from the above layer. The variable η is called the "learning rate" of the system.

This example embodiment utilized a learning algorithm conventionally known as Resilient Back propagation, also known as Rprop. The Rprop algorithm performs direct adaptation of the weight step based on local gradient information. If a partial derivative (and hence the weight change) alters its sign from the last update, it indicates that the last weight update was too big. In that case the magnitude of weight change is reduced. If the weight change retains its sign from the last update, the update value is slightly increased to help accelerate convergence. Accordingly, the algorithm for weight change was made and defined as follows:

```
For all weights and biases{ if (∂E/∂w_ij (t-1) * ∂E/∂w_ij (t) > 0) then {

Δ_ij(t) = minimum (Δ_ij(t-1) * η⁺, Δ_max)

Δw_ij(t) = -sign (∂E/∂w_ij (t)) * Δ_ij(t)

w_ij(t+1) = w_ij(t) + Δw_ij(t)
    } else if (∂E/∂w_ij (t-1) * ∂E/∂w_ij (t) < 0) then {

Δ_ij(t) = maximum (Δ_ij(t-1) * η⁻, Δ_min)
        w_ij(t+1) = w_ij(t) - Δw_ij(t-1)

∂E/∂w_ij (t) = 0
    } else if (∂E/∂w_ij (t-1) * ∂E/∂w_ij (t) = 0) then {

Δw_ij(t) = -sign (∂E/∂w_ij (t)) * Δ_ij(t)

w_ij(t+1) = w_ij(t) + Δw_ij(t)
    }
}
```

All inputs presented to the NN predictive model were normalized to values between −1 and +1. Each input set consisted of features extracted at a particular cut from one cutter, where each feature was represented by one input unit. There were about 300 input patterns for one cutter. For output, the wear values of the three flutes were provided (in $10^{-3}$ mm). Only training cutters (C1, C4 and C6) were used as their wear patterns were provided. The values of η− and η+ were set to 0.5 and 1.5.

A batch of 100 NN predictive models were trained. An evaluation function was used to select the best model. The selected model was used to predict the wear pattern of the other three cutters (C2, C3 and C5). Finally, in order to determine wears at integer values over the range 66 and 165 (in $10^{-3}$ mm), the maximum wear curves were interpolated for the integer values between 66 and 165.

Figure 7:
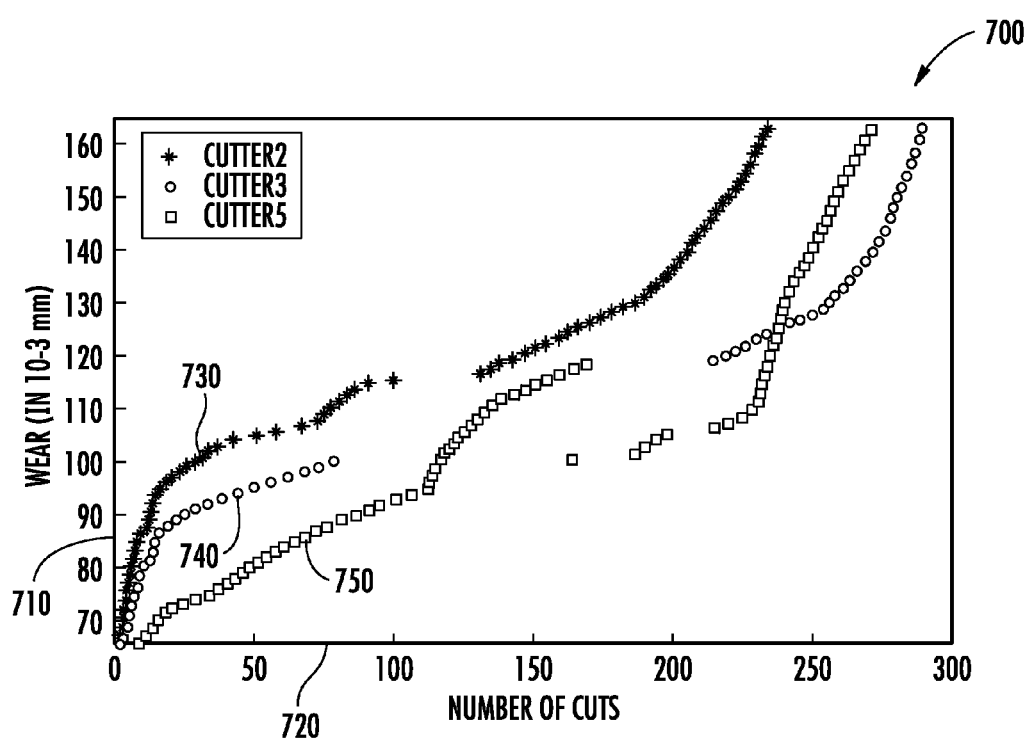
FIG. 7 is a chart illustrating a predicted RUL solution for a milling machine cutter of an example embodiment of the disclosure.

Turning now to FIG. 7, a chart 700 depicting the optimal predicted solution from an experimental test applying an example method embodiment of the predictive method described. As shown, an axis 710 depicts the wear and another axis 720 depicts the number of cuts performed by the cutters. Lines 730, 740, and 750 represent the number of cuts remaining and the predicted RUL as provided by the predictive model disclosed herein. It will be appreciated by those skilled in the art that the accuracy of the predicted RUL 730, 740, and 750 will increase as the predictive model is adapted with operational data from each cutter during each additional cycle.

The embodiments described above provide advantages over conventional devices and associated systems and methods. It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents. Furthermore, the foregoing description of the disclosure and best mode for practicing the disclosure are provided for the purpose of illustration only and not for the purpose of limitation—the disclosure being defined by the claims.

What is claimed is:

1. A method to predict a remaining useful life of a milling machine cutter head comprising a plurality of flutes, the method comprising the steps of:
    extracting features from reference data from a plurality of reference cutter heads, the reference data including reference vibration data that quantifies vibrations of the plurality of reference cutter heads in three dimensions in operation and reference wear data that quantifies a wearing of the flutes of the plurality of reference cutter heads after each of a plurality of respective cuts by the plurality of reference cutter heads;
    training at least two Neural Network predictive models in parallel for predicting the remaining useful life of a target cutter head based upon the extracted features from the reference data;
    evaluating the at least two Neural Network predictive models and selecting an optimal predictive model;
    obtaining operational data associated with the target cutter head comprising a plurality of flutes, the operational data including operational vibration data that quantifies vibrations of the target cutter head in three dimensions in operation and operational wear data that quantifies a wearing of the plurality of flutes after each of a plurality of cuts by the target cutter head;
    inputting features extracted from the operational data into the optimal predictive model; and
    estimating, by the optimal predictive model, the remaining useful life of the target cutter head.

2. The method of claim 1, further comprising:
    conditioning the reference data and the operational data prior to extracting the features; and
    applying a resilient back propagation learning algorithm having at least one weighting function at the evaluating step for optimizing the at least two Neural Network predictive models.

3. The method of claim 2, wherein the conditioning of the reference data and the operational data is performed by applying at least one noise reduction filter to the reference data and the operational data.

4. The method of claim 1, wherein estimating the remaining useful life of the target cutter head comprises estimating a number of cuts remaining for the target cutter head.

5. The method of claim 1, wherein the operational data is sensed real time from at least one sensor in signal communication with the target cutter head.

6. The method of claim 1, wherein the reference data further comprises reference acoustic emission data that quantifies acoustic emissions of the plurality of reference cutter heads in operation, and the operational data further comprises operational acoustic emission data that quantifies acoustic emissions of the target cutter head in operation.

7. The method of claim 1, wherein the reference wear data quantifies the wearing of each flute of the plurality of reference cutter heads in terms of a reduction of the respective flute in micrometers, and the operational wear data quantifies the wearing of each flute of the target cutter head in micrometers.

8. The method of claim 1, wherein the extracted features comprise time domain features that comprise time domain data statistics selected from a group consisting of root mean square (RMS), crest factor, variance, skewness, and kurtosis.

9. The method of claim 1, wherein the reference data includes reference force data that quantifies a force of the plurality of reference cutter heads in three dimensions on respective work pieces during operation, and the operational data includes operational force data that quantifies a force of the target cutter head in three dimensions on a work piece during operation.

10. The method of claim 1, wherein the evaluating step is performed by applying an evaluating function operable for comparing the at least two Neural Network predictive models against weighting functions to determine which Neural Network predictive model is optimal and based upon the results of the evaluating step, performing at least one of:
generating new Neural Network predictive models and performing the evaluating step; and
selecting the optimal Neural Network predictive model and proceeding to the next step.

11. The method of claim 1, wherein the estimating comprises assessing a plurality of operational data prior to an end of equipment useful life.

12. A non-transitory program storage device for predicting a remaining useful life of a milling machine cutter head comprising a plurality of flutes, the program storage device embodying instructions executable by a computer to carry out the steps of:
extracting features from reference data from a plurality of reference cutter heads, the reference data including reference vibration data that quantifies vibrations of the plurality of reference cutter heads in three dimensions in operation and reference wear data that quantifies a wearing of the flutes of the plurality of reference cutter heads after each of a plurality of respective cuts by the plurality of reference cutter heads;
training at least two Neural Network predictive models in parallel for predicting the remaining useful life of a target cutter head based upon the extracted features from the reference data;
evaluating the at least two Neural Network predictive models and selecting an optimal predictive model;
obtaining operational data associated with the target cutter head comprising a plurality of flutes, the operational data including operational vibration data that quantifies vibrations of the target cutter head in three dimensions in operation and operational wear data that quantifies a wearing of the plurality of flutes after each of a plurality of cuts by the target cutter head;
inputting features extracted from the operational data into the optimal predictive model; and
estimating, by the optimal predictive model, the remaining useful life of the target cutter head.

13. A system for estimating a remaining useful life of a milling machine cutter head comprising a plurality of flutes, the system comprising:
a database comprising reference data from a plurality of reference cutter heads, the reference data including reference vibration data that quantifies vibrations of the plurality of reference cutter heads in three dimensions in operation and reference wear data that quantifies a wearing of the flutes of the plurality of reference cutter heads after each of a plurality of respective cuts by the plurality of reference cutter head;
a processor in signal communication with the database, the processor configured to:
extract features from the reference data;
train a Neural Network predictive model based on the features for predicting a remaining useful life of a target cutter head comprising a plurality of flutes;
validate the Neural Network predictive model;
obtain operational data associated with the target cutter head, the operational data including operational vibration data that quantifies vibrations of the target cutter head in three dimensions in operation and operational wear data that quantifies a wearing of the plurality of flutes after each of a plurality of cuts by the target cutter head;
input extracted features from the operational data into the Neural Network predictive model;
estimate, by the Neural Network predictive model, a remaining useful life of the target cutter head; and
output results that quantify the remaining useful life.

14. The system of claim 13, wherein the Neural Network predictive model is configured to estimate the remaining useful life of the target cutter head in terms of a number of cuts remaining for the target cutter head.

15. The system of claim 13, wherein the validating step is performed by applying an evaluating function operable for comparing the Neural Network predictive model against weighting functions to determine if the Neural Network predictive model is acceptable and based upon the results of the validating step, performing at least one of:
generating a new Neural Network predictive model and performing the validating step; and
accepting the Neural Network predictive model and proceeding to the next step.

16. The system of claim 13, wherein the operational data is sensed real time from at least one sensor in signal communication with the target cutter head.

17. The system of claim 13, wherein the reference wear data quantifies the wearing of each flute of the plurality of reference cutter heads in terms of a reduction of the respective flute in micrometers, and the operational wear data quantifies the wearing of the plurality of flutes of the target cutter head in micrometers.

18. The system of claim 13, wherein the reference data includes reference force data that quantifies a force of the plurality of reference cutter heads in three dimensions on respective work pieces during operation, and the operational data includes operational force data that quantifies a force of the target cutter head in three dimensions on a work piece during operation.

19. The system of claim 13, wherein the Neural Network predictive model comprises three layers.

20. The system of claim 13, further comprising: determining if the output results are within a defined range and based upon the results of the determining step, generating a signal.

* * * * *